United States Patent
Travis (10) Patent No.: US 8,988,474 B2
(45) Date of Patent: Mar. 24, 2015

(54) WIDE FIELD-OF-VIEW VIRTUAL IMAGE PROJECTOR

(75) Inventor: Adrian Travis, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 604 days.

(21) Appl. No.: 13/185,319

(22) Filed: Jul. 18, 2011

(65) Prior Publication Data

US 2013/0021392 A1 Jan. 24, 2013

(51) Int. Cl.
*G09G 5/02* (2006.01)
*G02B 5/18* (2006.01)
*G02B 26/10* (2006.01)
*G02B 27/01* (2006.01)

(52) U.S. Cl.
CPC *G02B 5/18* (2013.01); *G02B 26/10* (2013.01); *G02B 27/0172* (2013.01); *G02B 2027/0125* (2013.01)
USPC .......................................................... 345/694

(58) Field of Classification Search
CPC .................................. G09G 5/02; G09G 5/00
USPC ..................................................... 345/694, 8
See application file for complete search history.

(56) References Cited

U.S. PATENT DOCUMENTS

| | | | |
|---|---|---|---|
| 5,132,839 A | 7/1992 | Travis | |
| 5,406,415 A | 4/1995 | Kelly | |
| 5,999,147 A | 12/1999 | Teitel | |
| 6,046,857 A | 4/2000 | Morishima et al. | |
| 6,232,934 B1 * | 5/2001 | Heacock et al. | 345/8 |
| 6,300,986 B1 * | 10/2001 | Travis | 349/5 |
| 6,712,471 B1 | 3/2004 | Travis et al. | |
| 6,847,488 B2 | 1/2005 | Travis | |
| 7,101,048 B2 * | 9/2006 | Travis | 353/69 |
| 7,292,749 B2 | 11/2007 | Gluckstad et al. | |
| 7,410,286 B2 | 8/2008 | Travis | |
| 7,621,640 B2 | 11/2009 | Lloyd | |
| 8,582,206 B2 | 11/2013 | Travis | |
| 2003/0165017 A1 | 9/2003 | Amitai | |
| 2006/0028400 A1 | 2/2006 | Lapstun et al. | |

(Continued)

FOREIGN PATENT DOCUMENTS

| | | |
|---|---|---|
| CN | 1440513 | 9/2003 |
| JP | 10301055 | 11/1998 |
| JP | 2001174746 | 6/2001 |

(Continued)

OTHER PUBLICATIONS

"Chinese Office Action", Chinese Application No. 201110272868.3, (Apr. 1, 2013), 10 Pages.

(Continued)

*Primary Examiner* — Fred Tzeng
(74) *Attorney, Agent, or Firm* — Jeremy Snodgrass; Judy Yee; Micky Minhas (57) ABSTRACT

This document describes techniques and apparatuses for implementing a wide field-of-view virtual image projector. A wide field-of-view virtual image projector may include a spatial light modulator configured to inject light rays into an input wedge. The input wedge acts to output the light rays with an increased fan-out angle into an output light guide positioned proximate the input wedge. The spatial light modulator is controlled to inject light rays into the input wedge effective to diffract the light rays out of the output light guide to generate a virtual image.

20 Claims, 9 Drawing Sheets

(56) References Cited

U.S. PATENT DOCUMENTS

2006/0238550 A1 10/2006 Page
2012/0062850 A1* 3/2012 Travis .......................... 353/31

FOREIGN PATENT DOCUMENTS

JP 2009122551 6/2009
WO 9900993 A1 1/1999

OTHER PUBLICATIONS

"Notice of Allowance", U.S. Appl. No. 12/882,994, (Jul. 12, 2013), 9 pages.

Travis, Adrian R., et al., "Flat Projection for 3-D", *In Proceedings of the IEEE*, vol. 94 Issue: 3, Available at <http://ieeexplore.ieee.org/stamp/stamp.jsp?tp=&arnumber=1605201>,(Mar. 2006), pp. 539-549.

"Non-Final Office Action", U.S. Appl. No. 12/882,994, (Feb. 1, 2013),17 pages.

Zhang, Rui "Design of a Polarized Head-Mounted Projection Display using FLCOS Microdisplays", *The Society for Imaging Science and Technology*, (1996),10 pages.

Zhang, Rui "Design of Head Mounted Displays", Retrieved at <<http://www.optics.arizona.edu/optomech/student%20reports/2007/Design%20of%20mounteddisys%20Zhang.pdf>>, (Dec. 12, 2007),6 pages.

"International Search Report and Written Opinion", International Application No. PCT/US2011/050471, (Apr. 9, 2012),8 pages.

Travis, et al., "The design of backlights for view-sequential 3D", Retrieved at <<http://download.microsoft.com/download/D/2/E/D2E425F8-CF3C-4C71-A4A2-70F9D4081007/Backlightforviewsequentialautostereo.docx>>, Retrieved Date: Apr. 27, 2011, pp. 4.

"Laser-Scanning Virtual Image Display", U.S. Appl. No. 12/882,994, filed Sep. 15, 2010, pp. 1-20.

Peli, Eli "Visual and Optometric Issues with Head-Mounted Displays", *IS & T/OSA Optics & Imaging in the Information Age, The Society for Imaging Science and Technology*, available at <http://www.u.arizona.edu/~zrui3/zhang_pHMPD_spie07.pdf>,(1996),pp. 364-369.

\* cited by examiner

WIDE FIELD-OF-VIEW VIRTUAL IMAGE PROJECTOR

BACKGROUND

A virtual image can be made by pointing a video projector into a light guide embossed with a grating to project the virtual image from a surface of the light guide. A pair of eyeglasses, or spectacles, can include a virtual image projector to project a virtual image in front of the eyes of a wearer of the eyeglasses. Virtual image projectors small enough to be placed on a pair of eyeglasses, however, typically project a small virtual image that appears too far away to the wearer of the eyeglasses.

SUMMARY

This document describes techniques and apparatuses for implementing a wide field-of-view virtual image projector. A wide field-of-view virtual image projector may include a spatial light modulator configured to inject light rays into an input wedge. The input wedge acts to output the light rays with an increased fan-out angle into an output light guide positioned proximate the input wedge. The spatial light modulator is controlled to inject light rays into the input wedge effective to diffract the light rays out of the output light guide to generate a virtual image.

This summary is provided to introduce simplified concepts in a simplified form that are further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and apparatuses for implementing a wide field-of-view virtual image projector are described with reference to the following drawings. The same numbers are used throughout the drawings to reference like features and components.

DETAILED DESCRIPTION

Overview

This document describes various apparatuses and techniques for implementing a wide field-of-view virtual image projector. This virtual image projector includes a spatial light modulator configured to inject light rays into an input wedge. The input wedge acts to output the light rays with an increased fan-out angle into an output light guide positioned proximate the input wedge. The spatial light modulator is controlled to inject light rays into the input wedge effective to diffract the light rays out of the output light guide to generate a virtual image. In some embodiments, the virtual image projector may be coupled to a pair of eyeglasses to generate the virtual image in front of a lens of the eyeglasses so that a wearer of the eyeglasses, looking through the lens of the eyeglasses, sees the virtual image.

Further, the input wedge of the virtual image projector can be configured to increase a vertical field-of-view of the virtual image, and the spatial light modulator can include a diffraction grating area to increase a horizontal field-of-view of the virtual image. By so doing, the virtual image generated by virtual image projector has a wide field-of-view both horizontally and vertically.

Example Environment

Figure 1:
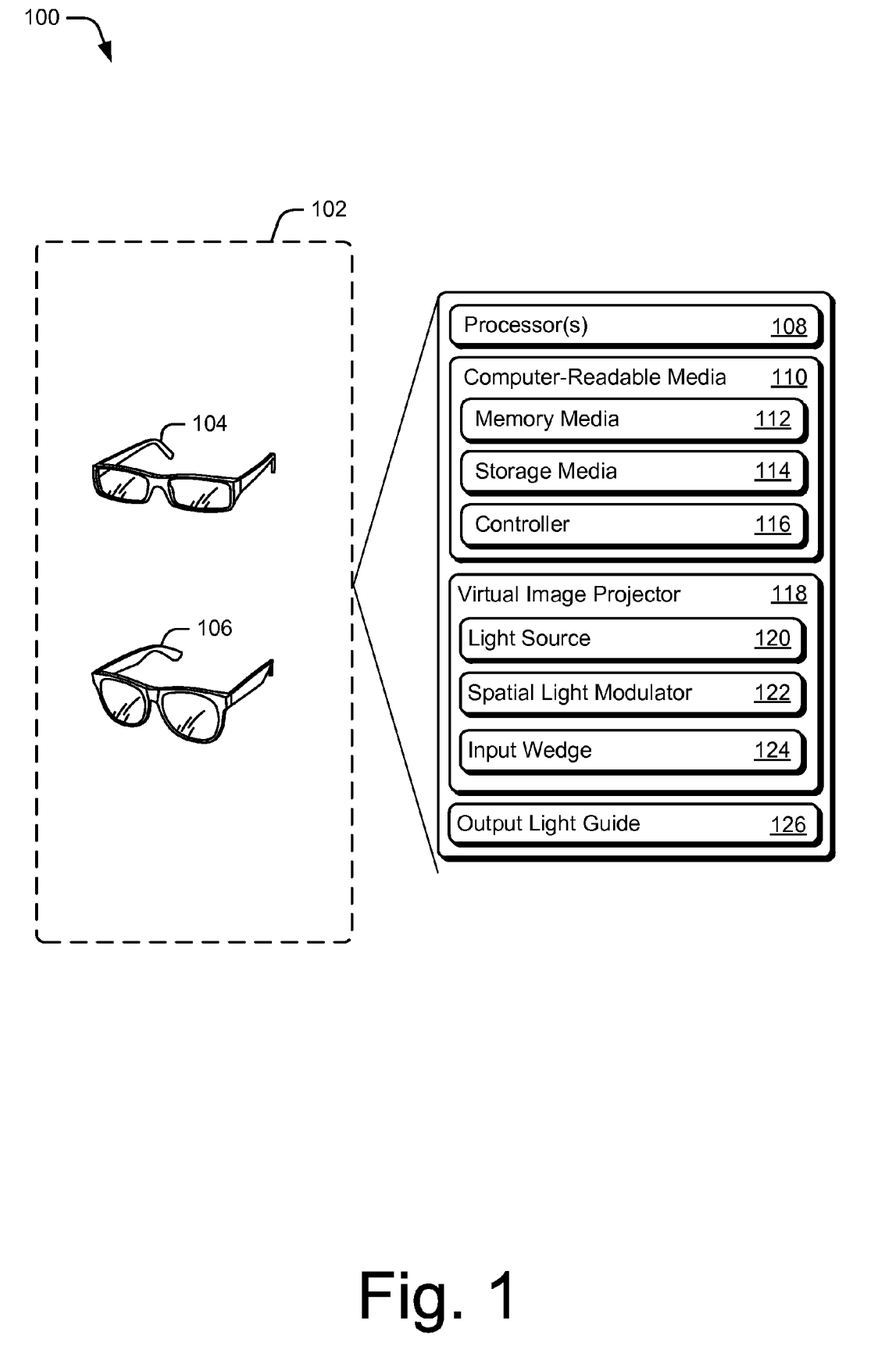
FIG. 1 illustrates an example environment in which a wide field-of-view virtual image projector can be implemented.

FIG. 1 is an illustration of an example environment 100 in which a wide field-of-view virtual image projector (herein a "virtual image projector") can be implemented. Environment 100 can be implemented in a head-mounted display device 102, which is illustrated, by way of example and not limitation, as one of eyeglasses 104 or sunglasses 106.

Head-mounted display device 102 includes processor(s) 108 and computer-readable media 110, which includes memory media 112 and storage media 114. Computer-readable media 110 also includes spatial light modulator controller (herein a "controller") 116. How controller 116 is implemented and used varies, and is described as part of the methods discussed below.

Head-mounted display device 102 also includes virtual image projector 118, which generates a wide field-of-view virtual image that can be viewed by a wearer of the head-mounted display, referred to as "viewer" herein. For example, virtual image projector 118 may be coupled to the lens of eyeglasses 104 to generate a virtual image of infinitely distant objects directly in front of the viewer's eye to cause a lens of the viewer's eye to adjust to an infinite or near-infinite focal length to focus on the objects. Virtual image projector 118 may be at least partially transparent so that the viewer can see external objects as well as virtual images when looking through a lens of head-mounted display device 102. In addition, it is to be appreciated that virtual image projector 118 may be small enough to fit onto the lens of eyeglasses 104 without being noticeable to a viewer wearing the eyeglasses.

In some cases, virtual image projector 118 can be implemented as two projectors to generate a virtual image in front of each of the viewer's eyes. When two projectors are used, each virtual image projector 118 can project the same virtual image concurrently so that the viewer's right eye and left eye receive the same image at the same time. Alternately, the projectors may project slightly different images concurrently, so that the viewer receives a stereoscopic image (e.g., a three-dimensional image). For purposes of this discussion, however, virtual image projector 118 will be described as a single projector that generates a single virtual image in front of a single one of the viewer's eyes.

Virtual image projector 118 includes a light source 120, a spatial light modulator 122, and an input wedge light guide (herein an "input wedge") 124. Virtual image projector 118 outputs modulated light rays with an increased fan-out angle into an output light guide 126 to generate a virtual image with a wide field-of-view. As described herein, the term "input wedge" describes a wedge-shaped lens that tapers in at least one direction.

Figure 2A:
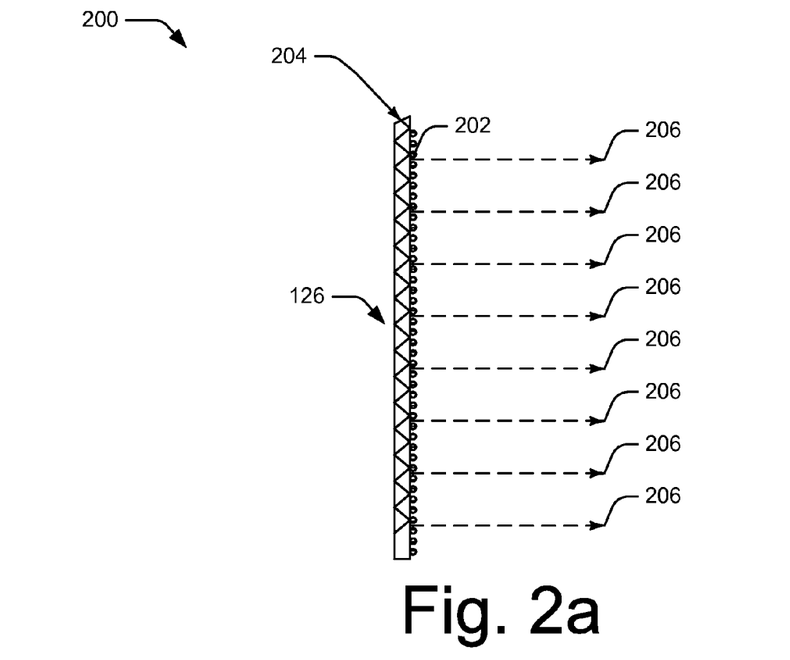
FIGS. 2a and 2b are more-detailed illustrations of the output light guide illustrated in FIG. 1.

FIGS. 2a and 2b illustrate detailed examples 200 of output light guide 126 in more detail. In these detailed examples, output light guide 126 is embossed with a shallow diffraction grating 202 that is barely visible, causing the light guide to appear transparent. In FIG. 2a, light ray 204 is injected into output light guide 126 to cause parallel light rays 206 to be diffracted out of the output light guide. For example, light ray 204 reflects back and forth in the output light guide, and each time the light ray hits shallow diffraction grating 202, a portion of the light ray is diffracted out. It is to be appreciated that a user looking through the output light guide will see what appears to be an infinitely distant point-source of light due to the parallel light rays.

In various embodiments, virtual image projector 118 includes spatial light modulator 122. Spatial light modulator 122 imposes spatially-varying modulation on a beam of light from light source 120, and can be implemented to project a true 3D floating image, known as a holograph. Spatial light modulator 122 can be controlled by controller 116 to cause light rays to focus either near or far. An image projected from a spatial light modulator, therefore, can be pre-distorted to prevent aberrations of the output light guide.

Spatial light modulator 122 may be a liquid crystal phase modulator that is composed of multiple liquid crystal displays (LCDs). Alternately, spatial light modulator 122 may be a liquid crystal amplitude modulator, or another type of spatial light modulator. When spatial light modulator 122 is configured as a liquid crystal phase modulator, the LCDs can be controlled by controller 116 to impose a superposition of gratings. Then, when the liquid crystals of spatial light modulator are illuminated with parallel rays of light from light source 120 (e.g., light emitting diodes (LEDs), light engines, or lasers), the superimposition of gratings on the spatial light modulator can be controlled to create several distant spot sources of light in the manner needed to synthesize a holographic image. Spatial light modulator 122, therefore, can be controlled to display horizontal or orthogonal gratings to move a virtual image up and down, or side to side, respectively.

Figure 2B:
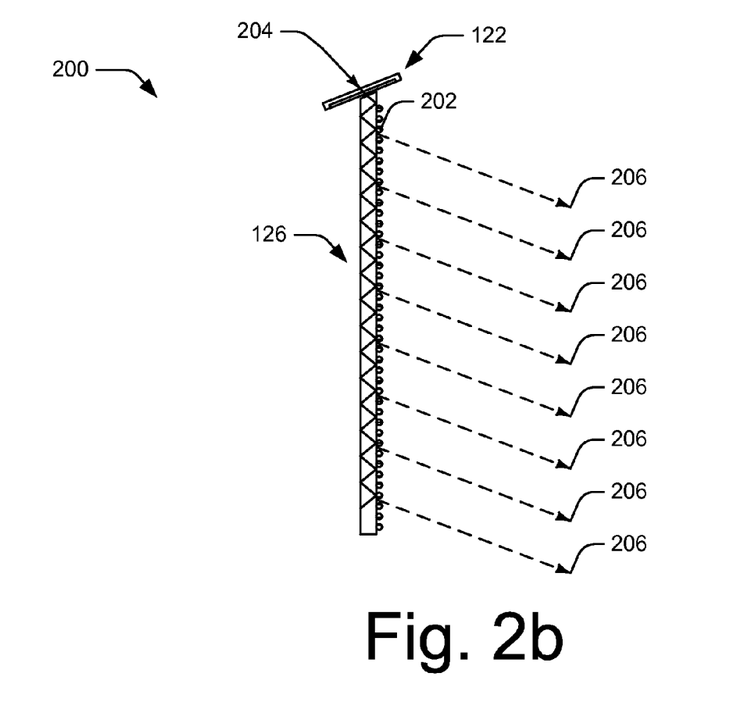

In FIG. 2b, for example, spatial light modulator 122 is controlled to display horizontal gratings to control an injection angle at which light ray 204 is input into the output light guide. By displaying horizontal gratings, light ray 204 can be scanned up and down to cause light rays 206 to be diffracted upwards or downwards out of output light guide 126 effective to move the virtual image up and down.

Figure 3:
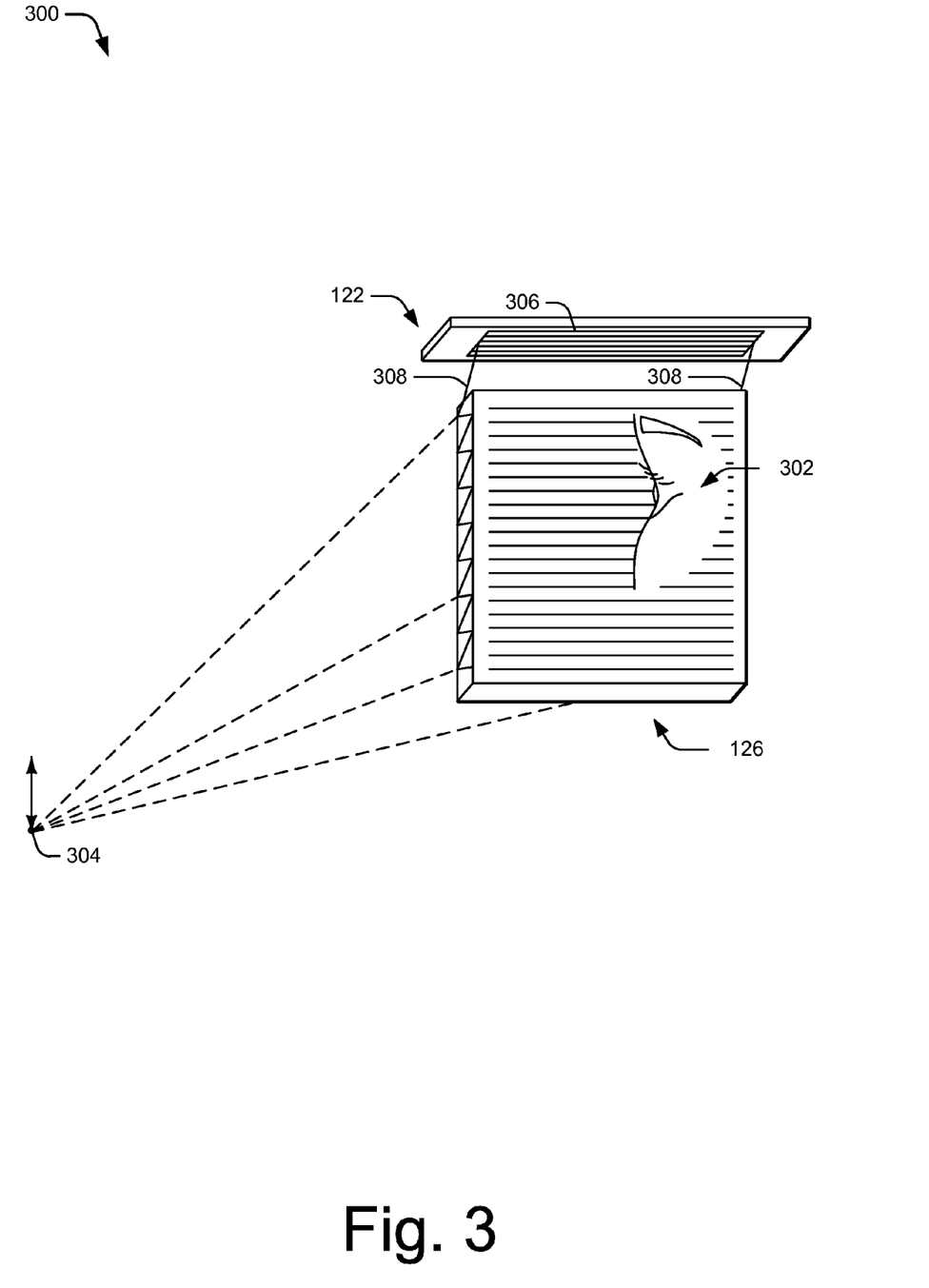
FIG. 3 is another more-detailed illustration of the output light guide illustrated in FIG. 1.

FIG. 3 illustrates another detailed example 300 of output light guide 126, here from a different perspective. In this example, an eye 302 of a viewer looking into output light guide 126 sees a pixel 304 of a virtual image. In this example, spatial light modulator 122 is controlled to display horizontal diffraction gratings 306 to control an injection angle at which light rays 308 are input into the output light guide. Horizontal diffraction gratings 306 enable light rays 308 to be scanned up and down to cause corresponding pixel 304 of the virtual image to move up and down. Spatial light modulators, however, typically can only scan to approximately three degrees because of the small size of the liquid crystal pixels. A virtual image generated from spatial light modulator 122 in FIG. 3, therefore, is three degrees vertically.

Figure 4:
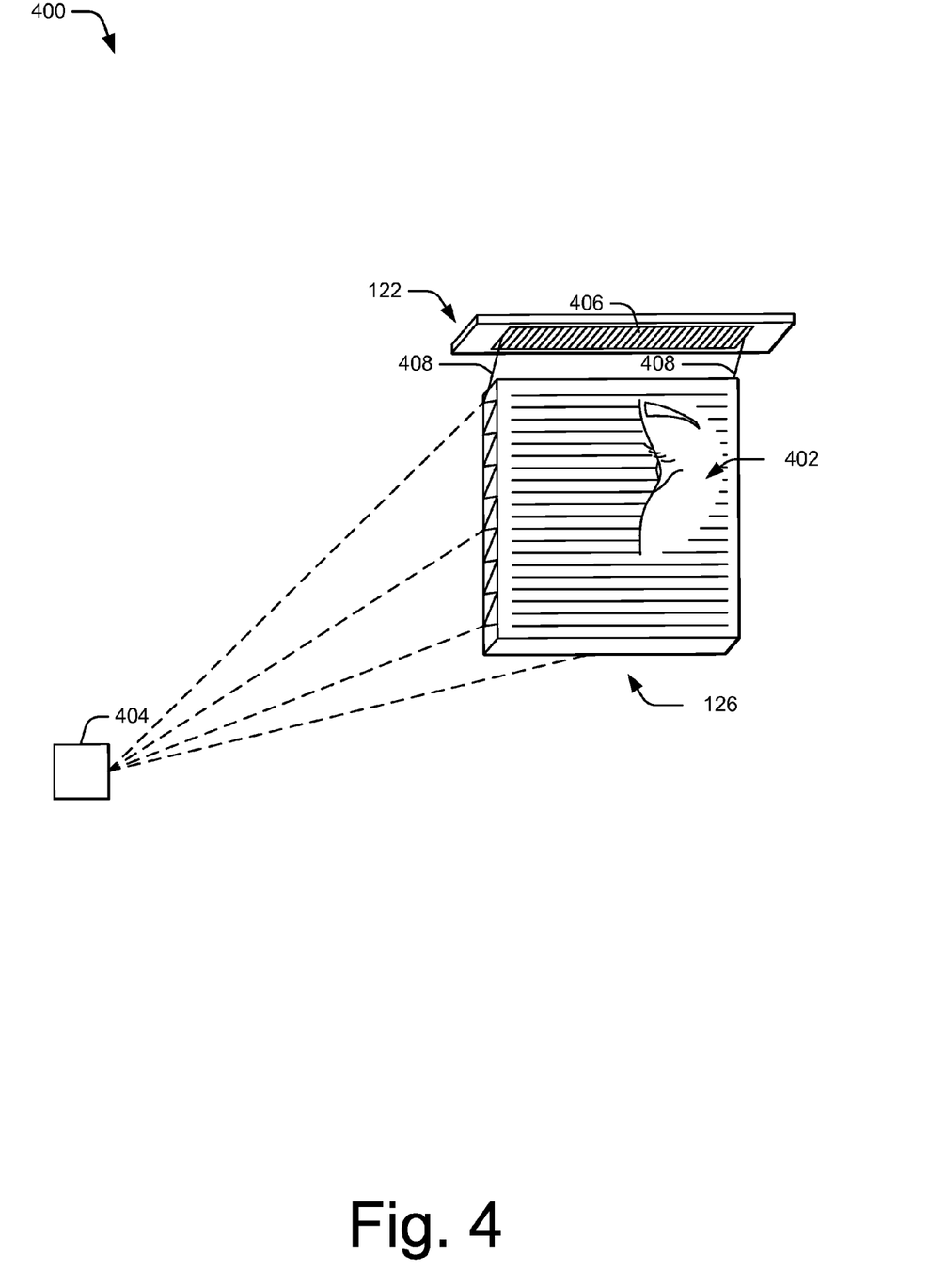
FIG. 4 is another more-detailed illustration of the output light guide illustrated in FIG. 1.

FIG. 4 illustrates another detailed example 400 of output light guide 126. In this detailed example, an eye 402 of a viewer looking into output light guide 126 sees a virtual image 404 that is three degrees vertically and three degrees horizontally. Spatial light modulator 122 is controlled to display orthogonal diffraction gratings 406 to control an injection angle at which light rays 408 are input into output light guide 126. Orthogonal diffraction gratings 406 enable light rays 408 to be scanned side to side to cause virtual image 404 to move side to side.

Spatial light modulator 122 is controlled to switch between displaying horizontal diffraction gratings 306 and orthogonal diffraction gratings 406 in order to generate virtual image 404, which is three degrees vertically and three degrees horizontally. More specifically, spatial light modulator is controlled to display horizontal diffraction gratings 306 (as illustrated in FIG. 3) to cause virtual image 404 to be three degrees vertically. Spatial light modulator is controlled to switch to display orthogonal diffraction gratings 406 (as illustrated in FIG. 4) to cause virtual image 404 to be three degrees horizontally. The three degrees by three degrees size of virtual image 404, however, may appear small or far away to the viewer.

Figure 5:
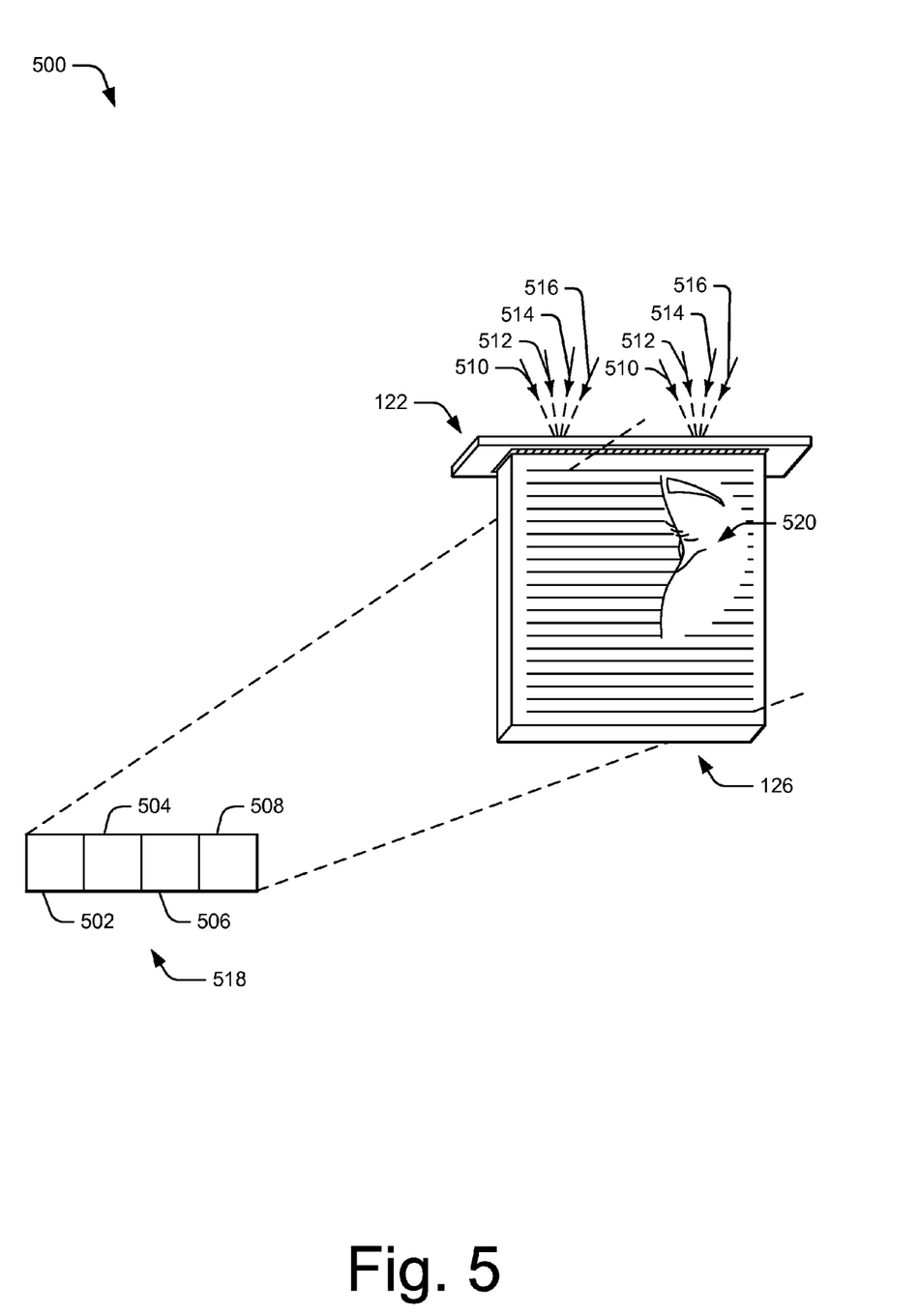
FIG. 5 is another more-detailed illustration of the output light guide illustrated in FIG. 1.

FIG. 5 illustrates another detailed example 500 of output light guide 126. In this detailed example, an illumination of the LCDs of spatial light modulator 122 is scanned to generate multiple virtual images 502, 504, 506, and 508. To scan the illumination of the LCDs, controller 116 controls spatial light modulator 122 to output four sets of parallel light rays 510, 512, 514, and 516 into the output light guide 126 effective to generate virtual images 502, 504, 506, and 508, respectively. As discussed with regards to FIGS. 3 and 4, each of the multiple virtual images is three degrees by three degrees. Controller 116 time-multiplexes the multiple virtual images to generate a virtual image 518 with a wide field-of-view that is composed of the multiple virtual images. In this example the horizontal field-of-view of virtual image 518 is twelve degrees because virtual images 502, 504, 506, and 508 each have a horizontal field-of-view of three degrees. Thus, an eye 520 of a viewer sees a virtual image with a wide field-of-view in the horizontal direction.

The vertical field-of-view of virtual image 518, however, is still only three degrees because the LCDs of spatial light modulator 122 may be unable to switch quickly enough to generate a vertical field-of-view greater than three degrees. To increase the vertical field-of-view, virtual image projector 118 couples spatial light modulator 122 to an input wedge 124. Input wedge 124 receives the light rays from spatial modulator 122 to output light rays with an increased fan-out angle (e.g., greater than three degrees) effective to increase the vertical field-of-view of virtual image 518.

Figure 6A:
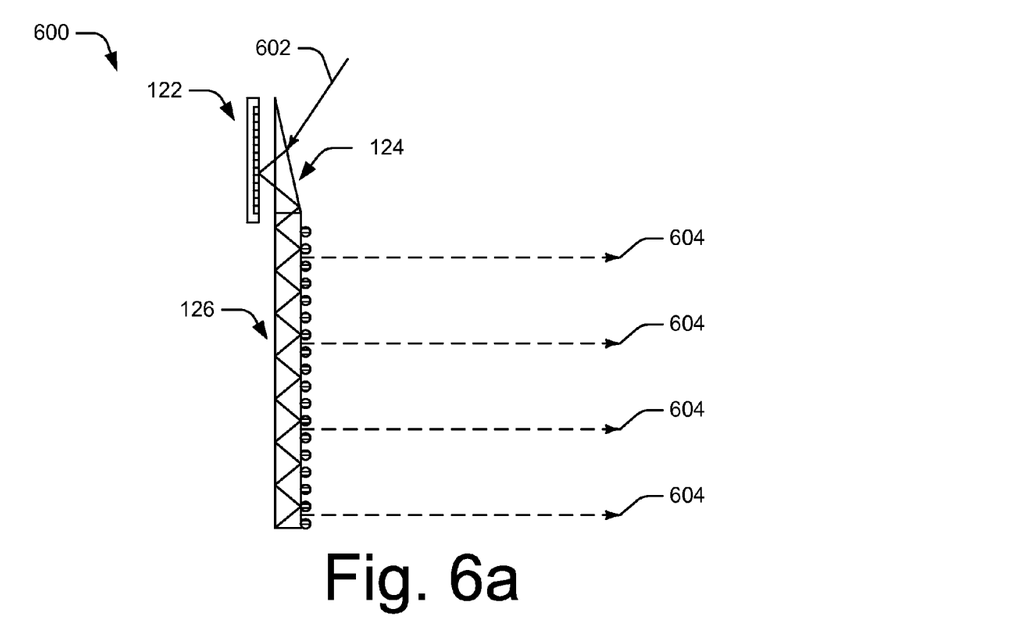
FIGS. 6a and 6b are more-detailed illustrations of the wide field-of-view virtual image projector configured with the input wedge and the spatial light modulator illustrated in FIG. 1.
Figure 6B:
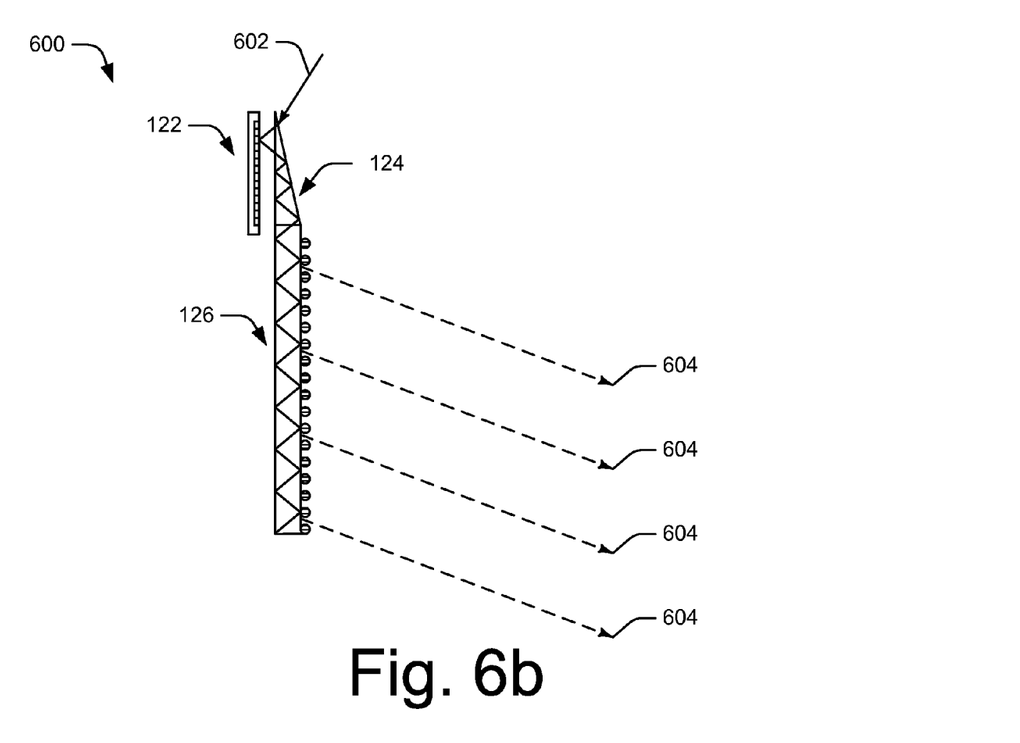

FIGS. 6a and 6b illustrate detailed examples 600 of virtual image projector 118 configured with input wedge 124 positioned proximate spatial light modulator 122. Spatial light modulator 122 outputs modulated light rays that are received as an input to input wedge 124. In this example, spatial light modulator 122 is controlled to project light rays at any location on the surface of input wedge 124. Input wedge 124 receives the modulated light rays from spatial light modulator 122 as input, and outputs the light rays at an increased fan-out angle.

For example, a light ray 602 injected into input wedge 124 exits the input wedge, and enters output light guide 126, at an angle that is greater than three degrees. The input wedge, therefore, enables light ray 602 to fan-out at an angle that is an integer multiple of three degrees, thereby increasing the vertical field-of-view of the virtual image. In this detailed example, input wedge 124 is shorter than output light guide 126. In some cases, however, output light guide 126 may be shorter than input wedge 124, or input wedge 124 and output light guide 126 may be equal in length.

Controller 116 is implemented to control spatial light modulator 122 to inject light ray 602 into input wedge 124 effective to diffract light rays 604 from the surface of output light guide 126. Diffracted light rays 604 form a virtual image with a wide field-of-view in the vertical direction. Controller 116 varies an input position at which light rays enter input wedge 124 from spatial light modulator 122 to control an output angle and output direction at which the light rays diffract out of output light guide 126 to form the virtual image.

For example, in FIG. 6a, controller 116 injects light ray 602 into the middle of input wedge 124 effective to diffract light rays 604 out of output light guide 126. Due to the configuration of the input wedge in relation to the output light guide, light rays injected into a thin end of the input wedge propagate along the output light guide at a shallower angle than light rays that enter at a thick end of the input wedge. Thus, in FIG. 6b controller 116 injects light ray 602 into a thin end of input wedge 124 effective to diffract light rays 604 downwards from the output light guide 126. Alternately, while not pictured, controller 116 can inject light ray 602 into a thick end of input wedge 124 effective to diffract light rays 604 upwards from the output light guide 126. Thus, input wedge 124 enables virtual image projector 118 to project light rays with a wide field-of-view in the vertical direction.

Figure 7:
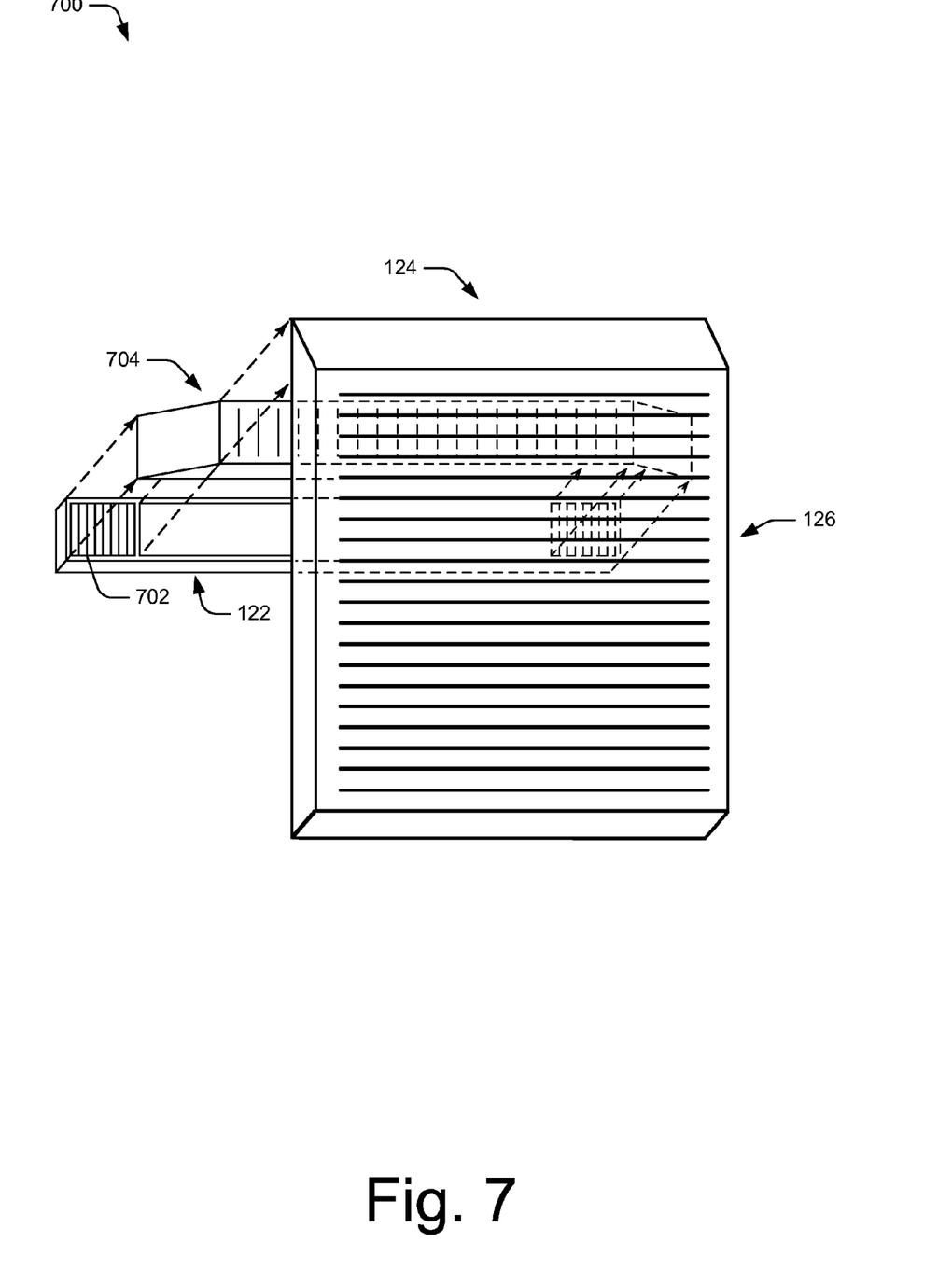
FIG. 7 is a more-detailed illustration of the wide field-of-view virtual image projector configured with the input wedge and the spatial light modulator injecting light into the output light guide illustrated in FIG. 1.

FIG. 7 illustrates another detailed example 700 of the virtual image projector, configured with input wedge 124 positioned proximate spatial light modulator 122, injecting light into an output light guide 126. As discussed above, input wedge 124 enables the light rays of spatial light modulator 122 to fan-out at an angle that is an integer multiple of three degrees, thereby increasing the vertical field-of-view of the projected virtual images from the spatial light modulator. In this detailed example, widths of spatial light modulator 122 and of output light guide 126 are equal.

In order to increase the horizontal field-of-view, an area at the end of spatial light modulator 122 is configured as a diffraction grating 702 that modulates the angle of the light rays injected into input wedge 124. In an embodiment, diffraction grating 702 is located at both ends of spatial light modulator 122 to double the field-of-view. For example, output light guides typically support a field-of-view of thirty degrees when light travels in one direction along the light guide. Configuring output light guide 126 with two diffraction gratings, therefore, may double the field-of-view typically supported by output light guides by allowing light to travel also in the opposite direction.

As shown in FIG. 5, the diffraction granting 702 enables scanning of an illumination of the LCDs of spatial light modulator 122 to generate multiple virtual images. The multiple virtual images are then time-multiplexed to generate a virtual image with a wide field-of-view that is composed of the multiple virtual images.

In addition, in order to increase the horizontal field-of-view of virtual image projector 118, a horizontal input wedge 704 may be positioned between spatial light modulator 122 and input wedge 124. Horizontal input wedge 704 is configured to receive the modulated light rays from spatial light modulator 122 and to increase the horizontal field-of-view of the virtual image projector by increasing the fan-out angle of the light rays injected into input wedge 124.

Example Method

Figure 8:
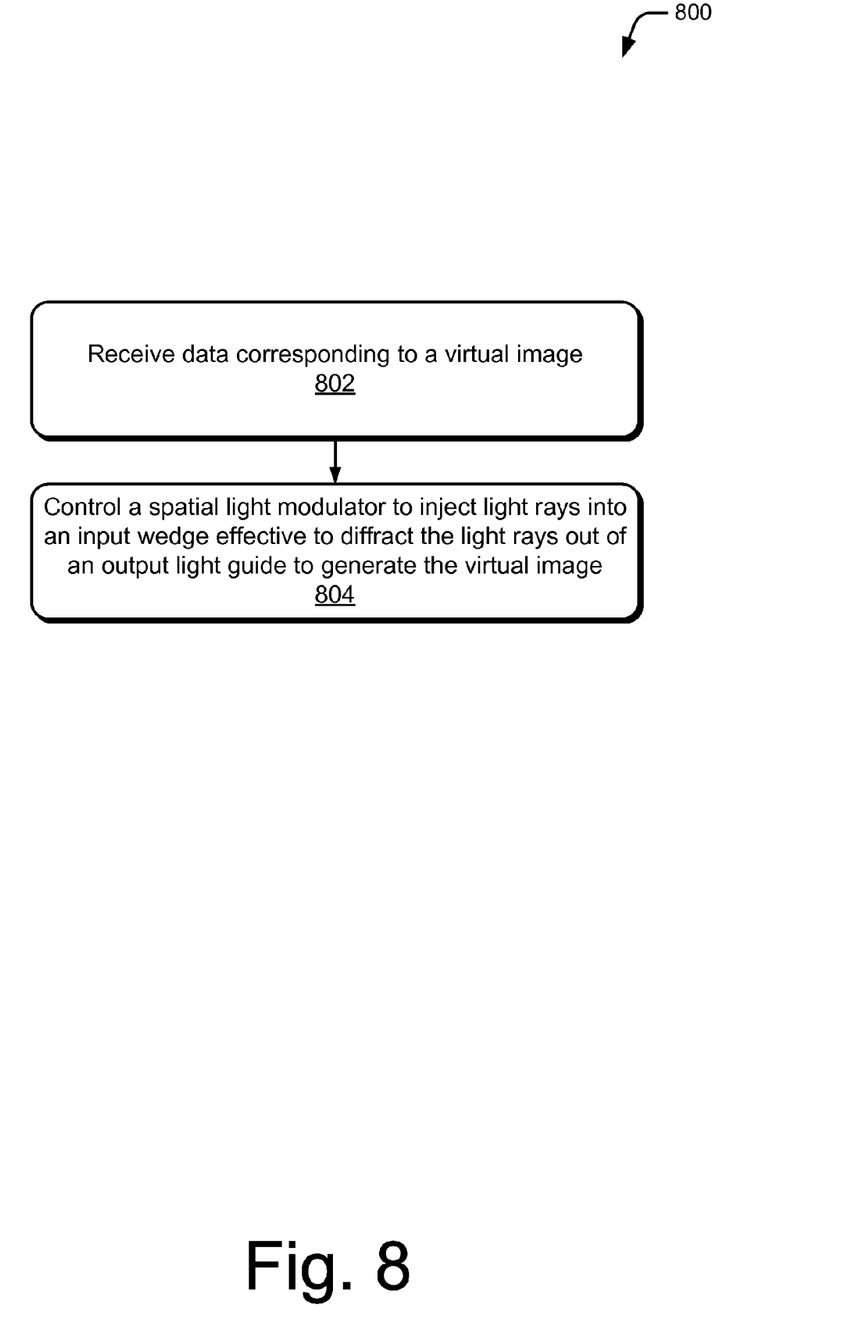
FIG. 8 illustrates an example method for controlling a wide field-of-view virtual image projector.

FIG. 8 is flow diagram depicting an example method 800 for controlling a spatial light modulator to inject light rays into an input wedge to generate a virtual image. Block 802 receives data corresponding to a virtual image (e.g., video data corresponding to a movie or to television programming). Block 804 controls a spatial light modulator to inject light rays into an input wedge effective to diffract the light rays out of an output light guide to generate the virtual image.

Controller 116 can be implemented to control spatial light modulator 122 to increase a horizontal field-of-view of the virtual image by scanning an illumination of liquid crystal displays of the spatial light modulator 122 to generate multiple virtual images. Controller 116 then time-multiplexes the multiple virtual images to generate the virtual image so that the virtual image is composed of the multiple virtual images.

Controller 116 can be implemented to control the spatial light modulator 122 to increase a vertical field-of-view of the virtual image by injecting the light rays into a thick end of the input wedge 124 effective to diffract the light rays upwards out of the output light guide 126. Alternately, controller 116 injects the light rays into a thin end of the input wedge 124 effective to diffract the light rays downwards out of the output light guide 126.

Example Device

Figure 9:
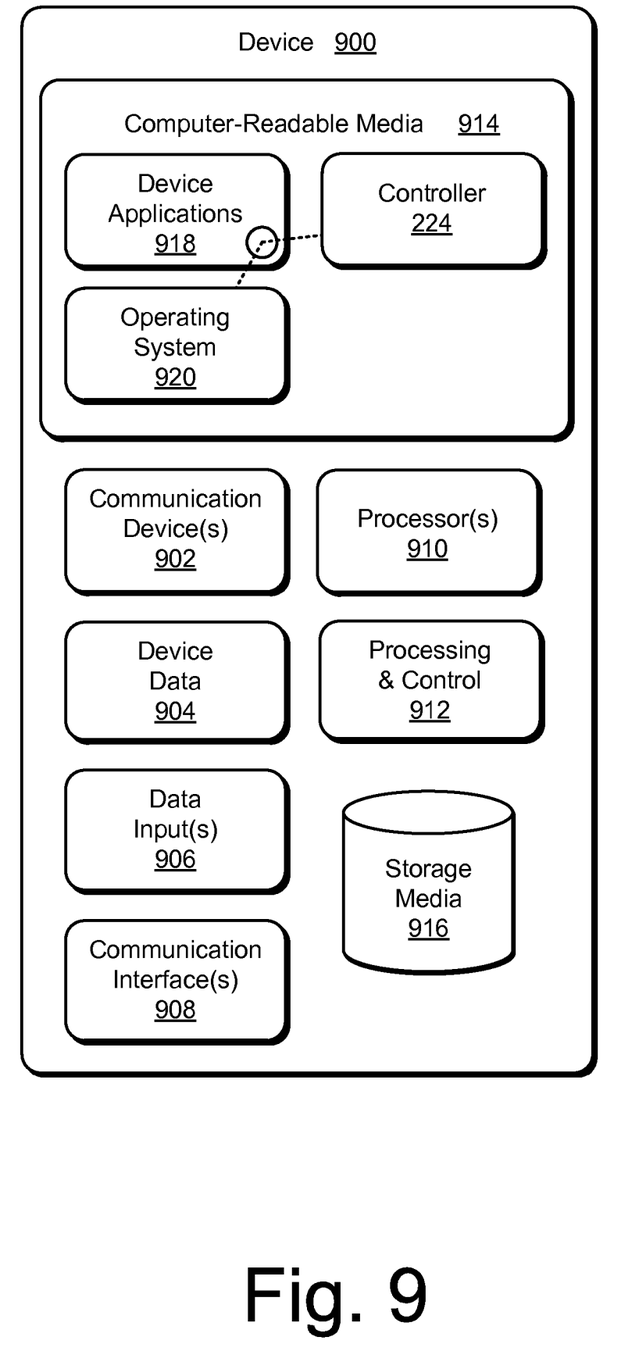
FIG. 9 illustrates an example device in which techniques for a wide field-of-view virtual image projector can be implemented.

FIG. 9 illustrates various components of example device 900 that can be implemented as any type of client, server, and/or display device as described with reference to the previous FIGS. 1-8 to implement techniques enabling a wide field-of-view virtual image projector. In embodiments, device 900 can be implemented as one or a combination of a wired and/or wireless device, a head-mounted display device (e.g., eyeglasses, sunglasses, etc.) as a form of flat panel display, television, television client device (e.g., television set-top box, digital video recorder (DVR), etc.), consumer device, computer device, server device, portable computer device, user device, communication device, video processing and/or rendering device, appliance device, gaming device, electronic device, and/or as another type of device. Device 900 may also be associated with a viewer (e.g., a person or user) and/or an entity that operates the device such that a device describes logical devices that include users, software, firmware, and/or a combination of devices.

Device 900 includes communication devices 902 that enable wired and/or wireless communication of device data 904 (e.g., received data, data that is being received, data scheduled for broadcast, data packets of the data, etc.). The device data 904 or other device content can include configuration settings of the device, media content stored on the device, and/or information associated with a user of the device. Media content stored on device 900 can include any type of audio, video, and/or image data. Device 900 includes one or more data inputs 906 via which any type of data, media content, and/or inputs can be received, such as user-selectable inputs, messages, music, television media content, recorded video content, and any other type of audio, video, and/or image data received from any content and/or data source.

Device 900 also includes communication interfaces 908, which can be implemented as any one or more of a serial and/or parallel interface, a wireless interface, any type of network interface, a modem, and as any other type of communication interface. The communication interfaces 908 provide a connection and/or communication links between device 900 and a communication network by which other electronic, computing, and communication devices communicate data with device 900.

Device 900 includes one or more processors 910 (e.g., any of microprocessors, controllers, and the like), which process various computer-executable instructions to control the operation of device 900 and to enable techniques for implementing a wide field-of-view virtual image projector. Alternatively or in addition, device 900 can be implemented with any one or combination of hardware, firmware, or fixed logic circuitry that is implemented in connection with processing and control circuits which are generally identified at 912. Although not shown, device 900 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 900 also includes computer-readable storage media 914, such as one or more memory devices that enable persistent and/or non-transitory data storage (i.e., in contrast to mere signal transmission), examples of which include random access memory (RAM), non-volatile memory (e.g., any one or more of a read-only memory (ROM), non-volatile RAM (NVRAM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 900 can also include a mass storage media device 916.

Computer-readable storage media 914 provides data storage mechanisms to store the device data 904, as well as various device applications 918 and any other types of information and/or data related to operational aspects of device 900. For example, an operating system 920 can be maintained as a computer application with the computer-readable storage media 914 and executed on processors 910. The device applications 918 may include a device manager, such as any form of a control application, software application, signal-processing and control module, code that is native to a particular device, a hardware abstraction layer for a particular device, and so on.

The device applications 918 also include any system components or modules to implement techniques using or enabling a wide field-of-view virtual image projector. In this example, the device applications 918 can include controller 116 for controlling a wide field-of-view virtual image projector.

CONCLUSION

This document describes various apparatuses and techniques for implementing a wide field-of-view virtual image projector. Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A virtual image projector comprising:
    a spatial light modulator configured to output modulated light rays, the spatial light modulator comprising a liquid crystal display;
    an input wedge positioned proximate the spatial light modulator, the input wedge configured to receive the modulated light rays from the spatial light modulator and to output the light rays at an increased fan-out angle; and
    an output light guide configured to receive the light rays, at the increased fan-out angle, from the input wedge, and to diffract the light rays out of the output light guide to generate a virtual image;
    the spatial light modulator configured to:
        scan an illumination of the liquid crystal display to generate multiple virtual images; and
        time-multiplex the multiple virtual images to generate the virtual image, the virtual image composed of the multiple virtual images.

2. A virtual image projector as described in claim 1, wherein the spatial light modulator comprises a phase modulator.

3. A virtual image projector as described in claim 1, wherein the output light guide is embossed with a diffraction grating that causes the light rays to be diffracted out of the output light guide.

4. A virtual image projector as described in claim 1, wherein widths of the spatial light modulator and the output light guide are equal.

5. A virtual image projector as described in claim 1, wherein the virtual image projector is coupled to a pair of eyeglasses to generate the virtual image in front of a lens of the eyeglasses.

6. A virtual image projector as described in claim 5, wherein the virtual image projector is at least partially transparent.

7. A virtual image projector as described in claim 1, wherein the input wedge is configured to increase a vertical field-of-view of the virtual image.

8. A virtual image projector as described in claim 1, wherein the spatial light modulator includes a diffraction grating area, the diffraction grating area configured to increase the horizontal field-of-view of the virtual image.

9. A method comprising:
    receiving data corresponding to a virtual image;
    controlling a spatial light modulator to inject light rays into an input wedge effective to diffract the light rays out of an output light guide to generate the virtual image, the controlling comprising controlling the spatial light modulator to inject the light rays into a thick end of the input wedge effective to diffract the light rays upwards out of the output light guide.

10. A method as described in claim 9, wherein the input wedge is positioned proximate the output light guide.

11. A method as described in claim 9, further comprising controlling the spatial light modulator to increase a horizontal field-of-view of the virtual image by:
    scanning an illumination of liquid crystal displays of the spatial light modulator to generate multiple virtual images; and
    time-multiplexing the multiple virtual images to generate the virtual image, the virtual image composed of the multiple virtual images.

12. A method as described in claim 9, further comprising controlling the spatial light modulator to increase a vertical field-of-view of the virtual image by injecting the light rays into a thin end of the input wedge effective to diffract the light rays downwards out of the output light guide.

13. A head-mounted display device comprising:
a light source configured to emit light rays;
a spatial light modulator configured to modulate the light rays;
an input wedge configured to receive the modulated light rays from the spatial light modulator and to output the light rays at an increased fan-out angle;
an output light guide configured to receive the light rays, at the increased fan-out angle, from the input wedge, and to diffract the light rays out of the output light guide to generate a virtual image; and
a controller configured to:
control the spatial light modulator to inject the light rays into the input wedge to cause the light rays to be diffracted out of the output light guide to generate the virtual image; and
control the spatial light modulator to inject the light rays into a thin end of the input wedge effective to diffract the light rays downwards out of the output light guide.

14. A head-mounted display device as described in claim 13, wherein the head-mounted display device comprises a pair of eyeglasses.

15. A head-mounted display device as described in claim 13, wherein the input wedge tapers in at least one direction.

16. A head-mounted display device as described in claim 13, wherein the spatial light modulator comprises a phase modulator.

17. A head-mounted display device as described in claim 13, wherein the spatial light modulator comprises liquid crystal displays.

18. A head-mounted display device as described in claim 13, wherein the spatial light modulator includes a diffraction grating area, the diffraction grating area configured to increase a horizontal field-of-view of the virtual image.

19. A head-mounted display device as described in claim 17, wherein the controller is further configured to control the spatial light modulator to a horizontal field-of-view of the virtual image by:
scanning an illumination of liquid crystal displays of the spatial light modulator to generate multiple virtual images; and
time-multiplexing the multiple virtual images to generate the virtual image, the virtual image composed of the multiple virtual images.

20. A head-mounted display device as described in claim 13, wherein the controller is further configured to control the spatial light modulator to increase a vertical field-of-view of the virtual image by injecting the light rays into a thick end of the input wedge effective to diffract the light rays upwards out of the output light guide.

* * * * *